US012710254B2

(12) United States Patent
Thoma

(10) Patent No.: US 12,710,254 B2
(45) Date of Patent: Aug. 18, 2026

(54) TRAINING APPARATUS INCLUDING A WEAPON

(71) Applicant: MERITIS AG, Cham (CH)

(72) Inventor: Marcel Thoma, Cham (CH)

(73) Assignee: MERITIS AG, Cham (CH)

( * ) Notice: Subject to any disclaimer, the term of this patent is extended or adjusted under 35 U.S.C. 154(b) by 679 days.

(21) Appl. No.: 18/251,787

(22) PCT Filed: Oct. 22, 2021

(86) PCT No.: PCT/EP2021/079338
§ 371 (c)(1),
(2) Date: Dec. 6, 2023

(87) PCT Pub. No.: WO2022/096288
PCT Pub. Date: May 12, 2022

(65) Prior Publication Data

US 2025/0027753 A1 Jan. 23, 2025

(30) Foreign Application Priority Data

Nov. 6, 2020 (DE) ..................... 10 2020 129 255.4

(51) Int. Cl.

| | |
|---|---|
| ***F41A 17/08*** | (2006.01) |
| ***F41G 3/26*** | (2006.01) |
| ***F41J 5/02*** | (2006.01) |
| ***G06T 19/00*** | (2011.01) |
| ***G09B 9/00*** | (2006.01) |

(52) U.S. Cl.
CPC ................. *F41J 5/02* (2013.01); *F41A 17/08* (2013.01); *F41G 3/2694* (2013.01); *G06T 19/006* (2013.01); *G09B 9/003* (2013.01)

(58) Field of Classification Search
CPC ........... F41J 5/02; F41A 17/08; F41G 3/2694; G06T 19/006; G09B 9/003
See application file for complete search history.

(56) References Cited

U.S. PATENT DOCUMENTS

| | | | | |
|---|---|---|---|---|
| 8,951,128 | B1 | 2/2015 | Farley et al. | |
| 10,030,931 | B1 | 7/2018 | Black et al. | |
| 2012/0183931 | A1 | 7/2012 | Galanis et al. | |
| 2012/0274922 | A1 * | 11/2012 | Hodge ....................... | F41J 5/02 356/28 |
| 2019/0022680 | A1 | 1/2019 | Adam | |
| 2019/0035345 | A1 | 1/2019 | Jinta et al. | |
| 2019/0353457 | A1 | 11/2019 | Northrup | |

FOREIGN PATENT DOCUMENTS

| | | | |
|---|---|---|---|
| DE | 102011084572 | A1 | 10/2012 |
| DE | 102016104186 | A1 | 9/2017 |
| JP | 2014169797 | A | 9/2014 |
| WO | 2010075481 | A1 | 7/2010 |

* cited by examiner

*Primary Examiner* — Robert P Bullington, Esq.
(74) *Attorney, Agent, or Firm* — FisherBroyles, LLP; Roger L. Browdy; Ronni S. Jillions

(57) ABSTRACT

Training apparatus (1) for at least one user (2), including a weapon (3) and consisting of a device for detecting a hit and a display device (6) for displaying virtual targets (13), wherein: the display device (6), worn by the user, takes the form of an augmented reality (AR) device, which visually displays to the user (2) at least the target (13) to be hit; the weapon (3) takes the form of a firearm, which fires at least one projectile (7); and the projectile (7) is detected by at least one laser (9, 11), evaluated and visually displayed on the display device (6).

12 Claims, 4 Drawing Sheets

TRAINING APPARATUS INCLUDING A WEAPON

Figure 1:
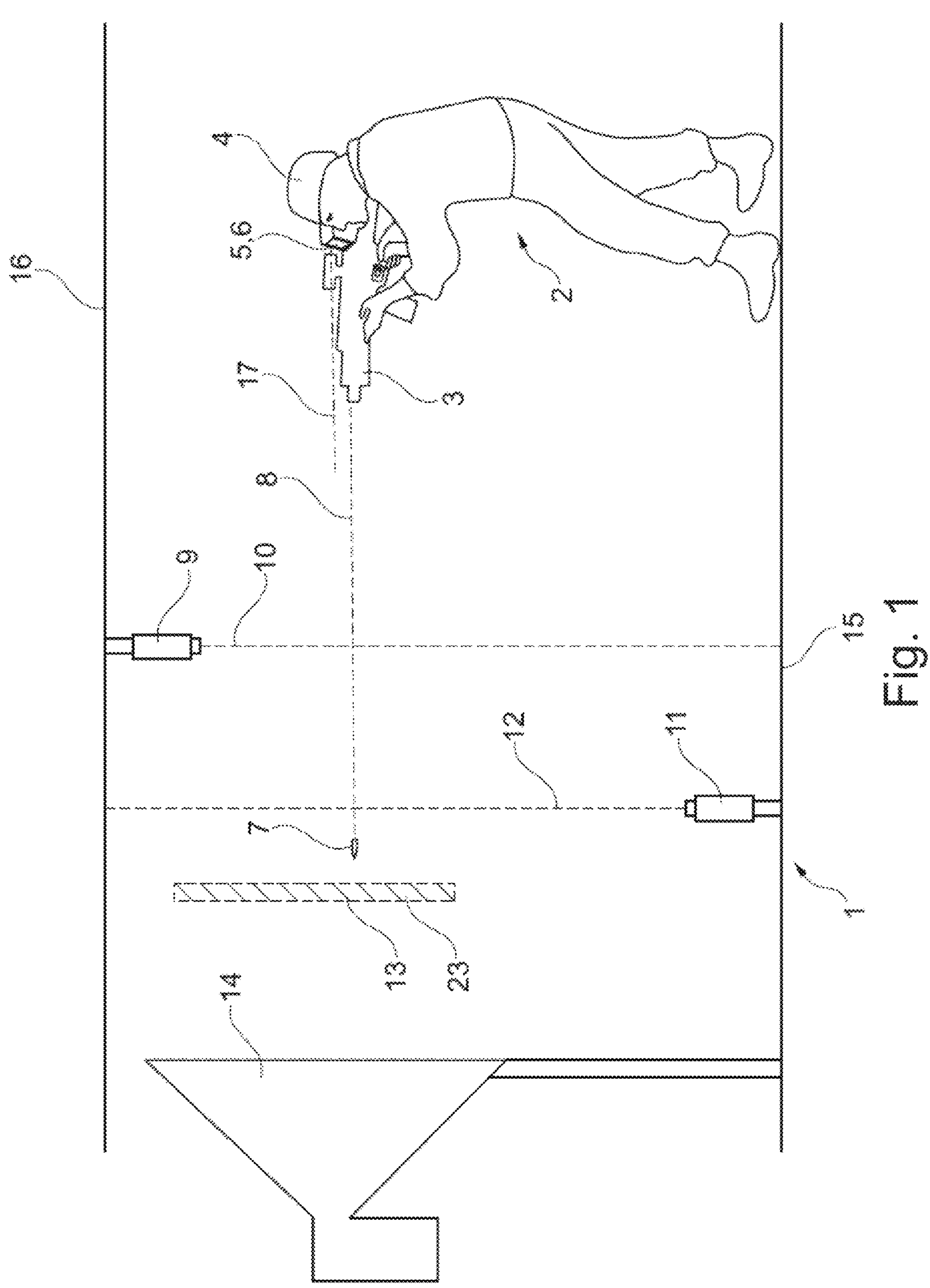

The invention relates to a training apparatus with a weapon according to the preambles of patent claims 1, 3, 5 and 12.

Safe handling of a firearm is practiced for example at a shooting stand. Practice shooting and competitive shooting takes place here. By a shooting stand is meant either a shooting range outdoors (firing range) or a shooting range in a shooting hall or shooting basement. The weapons used are either handguns, rifles, or archery weapons. The entire area which can be used by the shooter during the practice or the competition, i.e., also the area behind the shooter, is known as the shooting range. During the practice or the competition, the shooter fires a shot at a target, which may vary in its form, its representation, and its distance. The target serves for checking the shooting accuracy of a shooter or the target and hit accuracy of a firearm. The evaluation of the target is done optically by eye or by an electronic evaluation machine.

Besides a paper target, increasingly more electronic targets are being used today. These targets are indicated on a monitor, and the shooter shoots at a dark spot in a measurement frame. The outcome is evaluated by a computer and displayed electronically.

With US 2007/0045339 A1, for example, an electronic acquisition device for a projectile of a weapon is disclosed, wherein two lasers are arranged in front of the target to detect the projectile and then represent it graphically.

The fired ammunition or the projectile is intercepted by a backstop. The backstop is a device which catches the projectiles passing through or missing the target behind the targets of a shooting stand. For example, the backstop takes the form of a metal funnel, a chain projectile catcher, or a sand or dirt wall.

Laser-supported weapons are used for example during a tactical training, which is conducted as a realistic firearm simulation (duel simulation). The simulation serves for training and practice of a police officer, a soldier, or a person working in the security industry. Of course, the training apparatus can also be used in the hobby sector or by private persons. Here, the game of laser tag is known, in which the users simulate a realistic combat situation indoors or outdoors.

In order to train the safe handling of a weapon under real conditions, such training apparatus is always in demand. This involves the safe use of a real weapon, but also the training with a weapon under real conditions of use.

With der DE 10 2016 104 186 A1, a simulator is disclosed for the training of a helicopter crew. The user carries a virtual reality goggles during the training. The visual range of the user is recorded by a video camera. With the aid of a hand-tracking device, the hand movements of the user are detected. The data gathered are then represented with an image generator in the virtual environment of the virtual reality goggles. However, in the present embodiment, the user only sees virtual representations.

WO 2010/075481 A1 discloses a virtual reality interface system with a depth measurement camera, a treadmill, as well as a device for determining the standpoint or for checking the direction of looking and determining the pointing of the weapon's telescopic sight, as well as a computer which processes and represents all the data.

Moreover, so-called augmented reality pistols are known. The toy pistol comprises a holder for a smartphone. An app is required to operate the pistol, which provides a connection between the pistol and the smartphone. Several games are stored in the app, and the visual games can be combined and mixed with the real environment thanks to the augmented reality engineering. The transmission between the pistol, especially the trigger, and the smartphone occurs through a Bluetooth link.

The known training apparatus has the shortcoming that the virtual scenes are not represented realistically to the training user. Although a virtual environment is represented with the virtual reality goggles, the hand of the user and/or the weapons of the user only appear as an avatar in the virtual environment.

The problem of the present invention is therefore to provide a realistic training apparatus with which the trainee continues to see the real surroundings and in addition is presented with virtual images in the form of targets and objects.

As the solution of the stated problem. The invention is characterized by the technical teaching of claims 1, 3, 5 and 12.

The essential feature is that the training apparatus comprises a display device, which takes the form of an augmented reality (AR) device, wherein the weapon takes the form of a firearm, which shoots at least one projectile, and wherein the projectile is detected by at least one laser, evaluated, and visually represented on the display device.

Thus, the projectile is detected behind the target by one or more lasers and the flight path and the precise position are determined. These data are saved for later processing.

By a laser is meant both the physical effect and the device with which laser beams are generated. The laser generates radiation, such as microwaves, infrared, visible light, ultraviolet light, or also X-rays. In the embodiment according to the invention, for example, lasers with a transit time measurement (such as LIDAR) are used.

Or, for example, lasers are used in which the laser signal is detected by a sensor. The at least one laser then projects a two-dimensional laser network, which is detected by oppositely positioned sensors. Now, if a projectile flies through the laser network, the laser network will be broken at that site, which is then detected by the sensors. In this way, the exact x-y-z coordinates of the projectile can be determined. If a further laser with a further laser network and at least one sensor is arranged behind this, the ballistics of the projectile can be determined with the aid of the flight path through the two laser networks.

The display device according to the invention, which takes the form of an augmented reality device, has the important advantage that the trainee continues to see the real surroundings, at least in part, but also receives additional images superimposed by the display device. The additional information involves, preferably, potential targets or objects which should or should not be shot at with the weapon. However, the trainee is still able to see and use his real weapon through the augmented reality device. Thus, live firing at a virtual target takes place. The result of the firing is then superimposed in the display device for the trainee to see.

This constitutes a major difference from the known virtual reality (VR) devices, in which the trainee no longer perceives the real surroundings, since every detail is only presented virtually. This means that the trainee and his weapon are only seen in the form of an avatar. It is therefore not possible to use a live weapon with a virtual reality (VR) device, since the user does not see the live weapon and therefore cannot determine where the projectile is going.

By augmented reality (AR) is meant a computer-supported augmentation of the perception of reality. By augmented reality is meant the visual representation of information wherein computer-generated accessory information or virtual objects are presented to the user by means of overlaying or superimposing as an augmentation of images or videos.

With the embodiment according to the invention, it is now possible to represent targets and scenarios with the display device (such as augmented reality goggles) in the context of a shooting training. The nature of the targets will be adapted to the needs of the user. Thus, different targets can be represented with the display device and different shooting training can be conducted, e.g., with live weapons, training weapons (such as blue and red guns) or color marker ammunition. This yields the advantage that the training apparatus according to the invention is suitable for every branch, such as agencies with armed personnel (police, border protection, etc.), military, civilian security forces, hunters, but also private persons and sports shooters.

As the targets, for example photos, targets, objects, animals, videos with persons or scenarios are represented with the display device or overlain in the visual range of the user. The representation is done in 2D or 3D models. In addition, it is possible to project interactive contents on the display device by placing a person in another room in a blue/green box or some other kind of background. The actions of this person are then projected live on the display device.

The training apparatus according to the invention can be used for different kinds of training. This can be, for example, training outdoors or also training in a building, each time with a live weapon or a simulation weapon.

It is also possible to create entire virtual or real environments (streets, houses, rooms, landscapes, etc.) and to digitally enter potential targets there and represent them with the display device.

The display device preferably takes the form of goggles (AR goggles), a head-up display (such as a head-mounted display (HMD)), a smartphone, a tablet or a holographic system.

The head-mounted display (HMD) for example encompasses two displays (or two parts of a single display), each eye being associated with its own display. However, it is also possible for the display device to comprise only one monitor screen, which shows two images at the same time, one for each of the two eyes, on a monitor screen. The goggles then have a filter function, so that each eye is shown only one of the two images. Alternatively, a standard 2D monitor screen or a mobile device with a 3D viewer or a 3D CAD system can be used.

In one preferred embodiment, the weapon takes the form of a live firearm, which fires at least one projectile against a backstop, the flying projectile being detected by at least one laser, evaluated in regard to the target by evaluating the ballistic trajectory, and visually represented on the user-carried display device.

In one preferred embodiment, the entire image projections are digitally measured, i.e., every point of a target or person can be determined three or two-dimensionally.

The data of the training apparatus are processed either by the display device and/or by a computing unit. The computing unit can take the form, for example, of a computer, a server or a cloud. Preferably, the computing unit is located in proximity to the display device. But it is also possible for the computing unit to be located in a computer center or a cloud. Moreover, it is also possible for the functions of the computing unit to be carried out by software executed in the display device.

By a weapon is meant a weapon with live ammunition, a weapon with training ammunition, a training weapon, such as a blue or red gun weapon, a laser-supported weapon or a simulated weapon.

The following different kinds of training can be carried out with the training apparatus according to the invention.

Training with Live Weapon, i.e., Live Firing (Indoor and Outdoor)

For the training with a live weapon, i.e., with live ammunition, the hit detection is done by means of a laser. In front of the backstop, one, two or more laser networks are arranged in succession, projecting laser networks (=laser signals) not perceptible to the human eye. The bullet or the projectile is detected by the first and/or second laser signal. Since two laser signals are used, an angle calculate and the associated 3D computation of the ballistics is possible. Thus, the exact behavior of the projectile from being fired by the weapon to its striking of the target can be determined.

By the term ballistics is meant the form and the behavior of ballistic bodies (such as projectiles) during the phases of acceleration, flight, and impact. Now, with the aid of the at least two lasers placed one behind the other, it is possible in particular to determine and calculate the external ballistics, which involves the behavior of the fired projectile during flight, and the target ballistics, i.e., the effect of the projectile on the target.

Preferably, there are two laser networks for generating the two laser signals directly in front of or behind the target, i.e., in front of the backstop. However, it is also possible for the two lasers to be situated in space. In this way, for example, intermediate targets or targets in space can also be detected.

The laser data are compared to the digital image which is projected on the display device. Thus, a comparison takes place between the x-y-z coordinates of the digital image and the x-y-z data of the detected projectile. The trajectory and the hit are calculated and presented visually on the display device of the trainee. Optionally, the hit is additionally shown on a monitor for the instructor.

The calculation of the ballistics is done either with the display device and/or with a computing unit. The calculation is done in terms of projectile weight, muzzle velocity, twist length, and ballistic coefficient. Other values, such as sight height, wind direction and zeroing distance, can be set in advance.

In one preferred embodiment, at least one position detector is arranged on the weapon and/or on the body of the trainee. If the trainee should move outside of the previously defined safety region (e.g., outside the shooter stand) or point the weapon at targets outside the safety region, the training will be automatically interrupted. The trainee then receives an optical and/or acoustical message. It is moreover possible for the trainee to carry a device which puts out an electrical impulse to the trainee upon leaving the safety region with the weapon, upon safety violation, or upon virtual scoring by the opponent.

Training with Training Weapon

The weapons used are pure training weapons, with which no projectile is fired. These may be, for example, weapons which simulate the firing of a cartridge electrically or with gas or air pressure, i.e., in particular the recoil. It is also possible to use pure training weapons made of plastic with no functions. Genuine weapons firing blanks can also be used.

The firing or the pulling of the trigger is determined by means of a microphone mounted on the weapon, which identifies the bang of the blanks as a signal and sends this to the system together with an identification of the shooter. When using plastic weapons with no functions, the pulling of the trigger or the detection is done by means of pressure sensors on the trigger (in front of or behind the trigger).

Preferably, the weapon and/or the trainee has a position sensor, which calculates and relays the pointing of the weapon and the shooter. The system combines the two data sets and shows the hits on the display device of the trainee.

Optionally, the hit is additionally shown on a monitor for the instructor. Alternatively, an optional laser can also be mounted on the weapon and the identification of the hit can be ascertained by camera.

In this embodiment as well it is possible to define a safety region, the training being interrupted when the shooter leaves the safety region or the weapon is pointed at targets outside the safety region. This ensures that the same practice can be carried out at first with training weapons and then with the real weapons in live firing.

Training with the Use of Color Marker Ammunition

The weapons used are special training weapons, which fire color projectiles. Upon impact on a hard surface, the projectiles burst open and leave behind a color dot.

The hits are identified either by means of the laser network, in which at least one or two laser signals arranged in succession are projected, which detect the projectile of the color marker ammunition and calculate the trajectory, as well as the hits. Or the weapon and/or the trainee has a position sensor, which calculates and reports the position data of the weapon and the shooter.

In one preferred embodiment, the training apparatus consists of the following components:

- Computing unit, which compares position data of sensors with the digital data of the target representation, calculates, and displays visually.
- The interconnection of various hardware components and the incorporation of AR goggles in the shooting simulation or in the shooting training in connection with position sensors, the digital representation of targets (photos, videos, live stream, interactive targets, abstract targets (circles, triangles, etc.)).
- Display device, such as AR goggles
- Position sensors
- Automatic target image representation by means of sensors In another preferred embodiment, the training apparatus is used for a training on a shooting course (so-called CQB training course) in buildings or outdoors during dynamic training. Automatic target representations can be activated on the display device by means of sensors (light barriers, thermal image, pressure plates). For example, if a trainee enters a room, he is automatically presented with a target image on the display device. This is relayed automatically via a radio network or Bluetooth upon activation of the sensor (for example, crossing the light barrier). These sensors are connected wirelessly to the system. In addition, targets or objects can be superimposed without sensors based on the position identification of the trainee.

The sensors can be installed stationary in training centers or be used mobile for temporary facilities and they are connected by means of radio link or cable to the control system.

Besides the training apparatus, further protection is claimed for a method for operating the training apparatus. The method involves the following steps:

- shooting of at least one projectile (7) from a weapon (3), which takes the form of a firearm;
- detecting of the flying projectile (7) by at least one laser (9, 11)
- evaluating of the ballistics (8) of the projectile (7)
- evaluating whether a hit by the projectile (7) has occurred on the virtual target (13);
- representation of the hit in the display device (6).

In another preferred embodiment, a shooting region and a safety region are defined with the training apparatus. A safety region is for example always necessary when real projectiles are being fired with the weapon during the training unit. Preferably, a conventional live weapon is used. This can be a service weapon, for example.

The training apparatus is used for example in a closed room, a shooting stand, or a shooting course. In these environments, it must be assured that the live projectile is intercepted by a backstop or the like and no persons or objects in the vicinity of the user are struck by it. Since the user is in a stress situation during the training unit, it may happen that the live projectile misses its target or a shot is accidentally fired in another direction. This is hindered with the training apparatus and the definition of a shooting region and a safety region.

By a shooting region is meant the region within which the live projectile can be fired. Preferably, the shooting region corresponds to the size of the backstop behind it. Within the shooting region, the target is superimposed by the display device. Furthermore, the lasers used for the detection of the projectile are located in the shooting region.

There are different ways of determining the shooting region and the safety region:

- the two regions (shooting and safety region) can be defined by coordinates (such as satellite position coordinates);
- the two regions are defined by angles. For example, the shooting region extends for 90° and the safety region for 270°;
- the two regions are defined by means of tags. For example, at least one RFID-tag is arranged on each of the two side surfaces of the backstop. Of course, it is also possible to arrange multiple tags inside a room or on a shooting course.

In addition, the user and/or the weapon is outfitted with a sensor, for example, by which the position is determined. The sensor for example can take the form of a position sensor or an acceleration sensor. Furthermore, the pointing of the weapon can be ascertained with at least one sensor, while an arithmetic unit defines a shooting region and a safety region and monitors the current pointing of the weapon in terms of the regions.

Preferably, the weapon comprises a sensor in the form of a tracker. This makes it possible to use more than only one weapon at the same time for the same target. Furthermore, a precise scoring of hits in terms of response time, muzzle angle, shooting time, point of impact, effect, and number of shots can be done.

The training apparatus for example comprises a control unit, which monitors the pointing of the weapon, and the control unit determines and reports when one leaves a previously defined safety region. Either the control unit is separate or it is integrated in the arithmetic unit.

The data are evaluated by the arithmetic unit and an appropriate action is carried out, which can be perceived by the user. The actions may be different, and they may also be combined with each other. This may be, for example, an acoustical or optical signal and/or a tactile action. Thus, the user of the training apparatus is told by means of various devices that he or the weapon is situated within the shooting region or outside the shooting region, i.e., in the safety region.

Various possibilities and devices for the shooting and safety region are presented with the aid of the following examples.

If the weapon is pointing at a target within the shooting region, this will be indicated to the user by means of an optical signal (e.g., green) with the display device.

If the weapon moves outside the shooting region, i.e., into the safety region, the user will receive a new optical signal (e.g., red). The transitions between the shooting and the safety region can be indicated to the user for example with a further optical signal (e.g., orange).

Furthermore, it is possible to put out an acoustical, haptic, or optical signal which the user perceives upon leaving the shooting region with the weapon.

A further example is that the user can only use or fire the weapon inside the shooting region. Once the weapon is moved into the safety region, the projectile cannot be fired any more. This is achieved for example with a locking device of the trigger of the weapon or an electronically controlled ignition mechanism. The weapon is unlocked during the training. Once the user moves the weapon from the shooting region to the safety region, the locking device becomes active, so that no projectile can be fired.

It is likewise possible to interrupt the training when the user leaves the safety region or the weapon is pointed at targets outside the safety region.

A further example of a device for perception of the shooting and safety region is that the user carries at least one pad, which puts out an impulse. The impulse can be, for example, a stimulating current or a vibration signal, producing a muscular contraction pain or a stimulation, respectively, in the user. As soon as the weapon is moved outside the shooting region into the safety region, the user receives an impulse via the pad.

The object of the present invention results not only from the subject matter of the individual patent claims, but also from the combination of the individual patent claims with each other.

All specifications and features disclosed in the documents, including the abstract, and especially the spatial representation shown in the drawings, are claimed as essential to the invention, insofar as they are novel individually or in combination as compared to the prior art.

In the following, the invention shall be explained more closely with the aid of drawings representing only one way of implementing it. Further essential features and benefits of the invention will emerge from the drawings and their description.

There are shown:

FIG. 1: schematic representation of a user training in a training room

Figure 2:
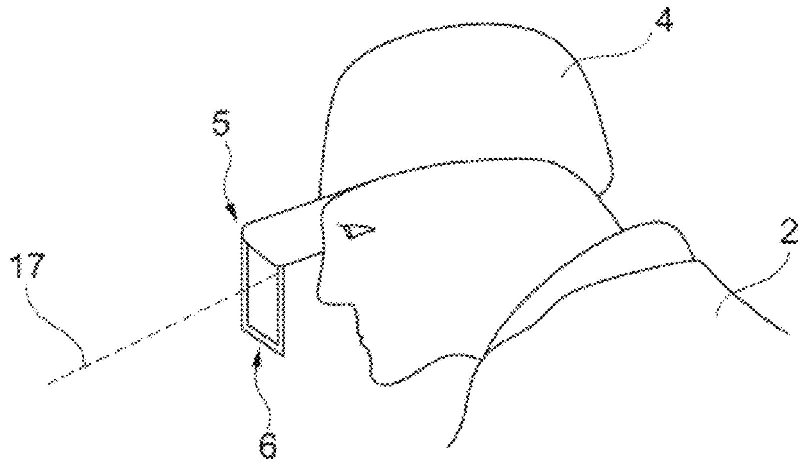

FIG. 2: schematic representation of a user with a display device

Figure 3:
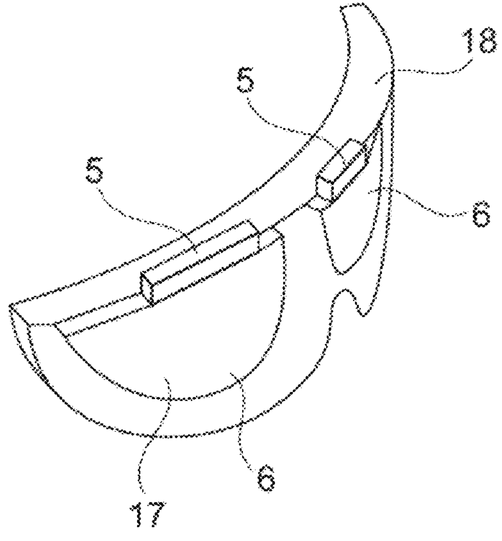

FIG. 3: representation of goggles with display device

Figure 4:
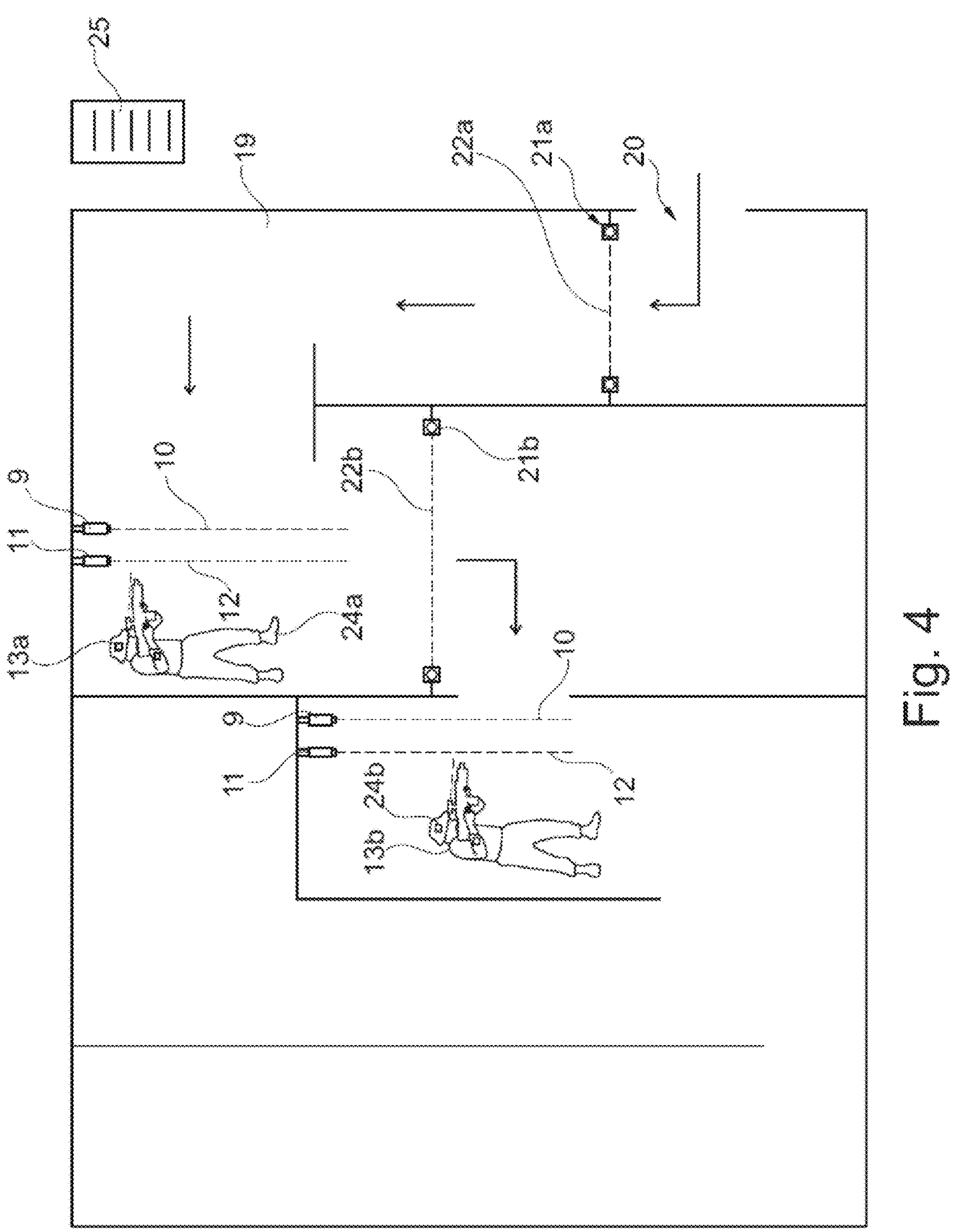

FIG. 4: schematic top view of a training room with AR targets

Figure 5:
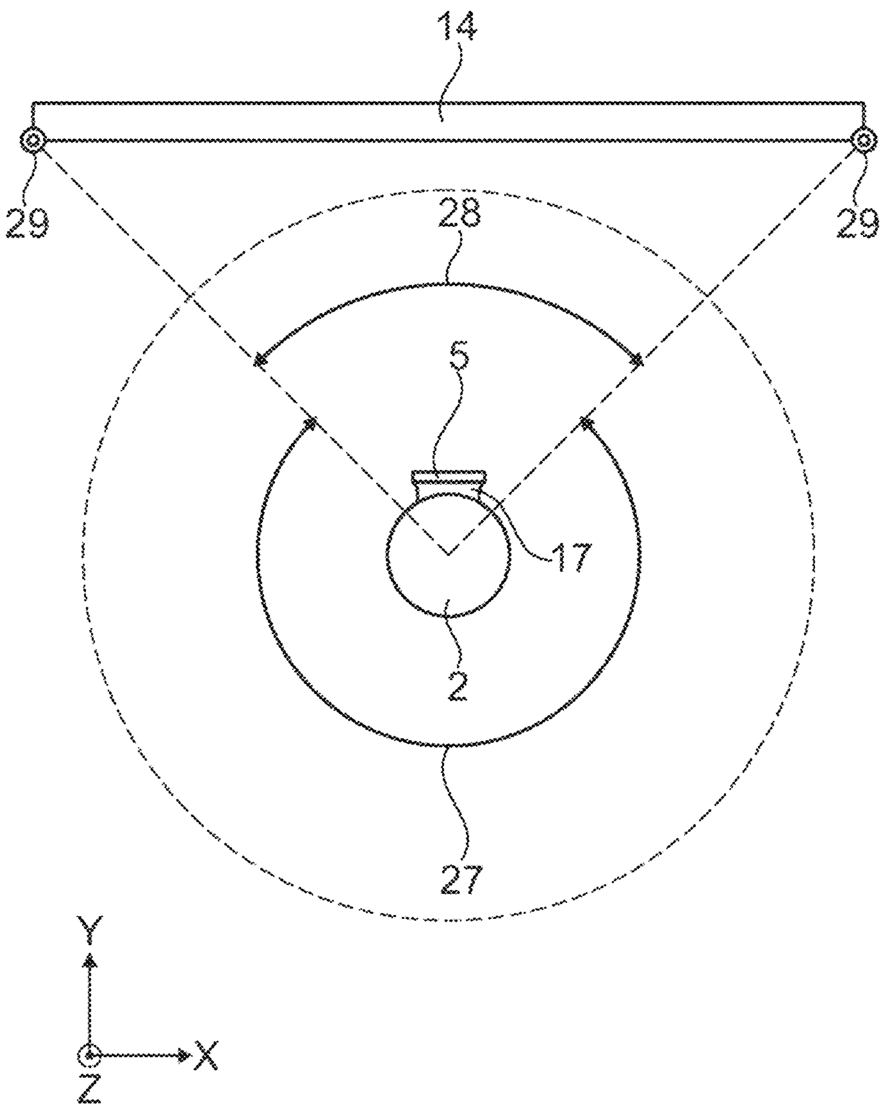

FIG. 5: representation of the user and his safety region

FIG. 1 shows the training apparatus 1 with a user 2. The user 2 is located in a training room 19 with a ceiling 16 and a floor 15.

The user 2 carries a weapon 3 in the form of a firearm which shoots live projectiles 7. On his head the user 2 carries a helmet 4, having a display device 5. The display device 5 is an augmented reality (AR) device or goggles, in the form of a head-up display 6. The display device 5 or the head-up display is situated within the visual field 17 of the user on the helmet 4. This means that the user 2 looks through the display device 5. In this way, the user sees not only the real environment, but also virtual images are additionally superimposed for the user 2 with the augmented reality (AR) device in the visual field 17.

According to FIG. 1, the visual target 13 (represented in dashes) is superimposed for the user 2 in his visual field 17 by the augmented reality (AR) device, taking the form of the target 23. Thus, the user 2 perceives within his visual field 17 not only the real training room 19, the real weapon 3, his real hand and equipment, and so forth, but also the visually presented target 13, which takes the form of the target 23.

With the real weapon 3, the user 2 fires one or more shots, so that a projectile 7 flies along the trajectory, i.e., the ballistics 8, and is intercepted by the backstop 14.

A first laser 9, which is situated in front of, behind, or at the height of the backstop 16 in the training room 19, projects a first laser signal 10. A second laser 11 is situated behind the first laser 15 of the training room 19 and projects a second laser signal 12. The two lasers 9, 10 are situated one after the other, at a distance from each other.

Alternatively, a laser network is formed from multiple lasers and sensors, being situated in the region of the backstop.

The fired projectile 7 flies along the trajectory through the first laser signal 10 and then through the second laser signal 12 and is thus detected by both lasers 9, 11. By the placement of two lasers 9, 11 in succession, the ballistics 8 of the projectile 7 can now be determined. With the aid of these data, it is now possible to determine a hit on the virtual target 13. This means that a bit of a real projectile 7 in a virtual target 13 is determined. i.e., on the target 23.

Both the ballistics 8 of the projectile 7 and the data of the augmented reality (AR) device are acquired by a computing unit, evaluated, and represented on the display device 5 of the user 2. Moreover, it is possible for the represented data to also be presented on an external monitor, so that outside or third parties are able to follow along with the shooting training.

The display device 5 represents the target 13 virtually, while the actual position of the virtual target 13 is determined upon firing a shot from the weapon 3. The data on the ballistics 8 of the projectile 7 are then obtained. The position of the virtual target 13 is then evaluated with the ballistics 8 and the result (=hits) is represented on the display device 5.

FIG. 2 shows the user 2 with a helmet 4. In the visual field 17 of the user 2 is located the display device 5, in the form of an augmented reality (AR) device. According to FIG. 2, the display device 5 takes the form of a head-up display 6. The display device 5 moreover can also take the form of goggles 18 or simply a display which is arranged by a removable fastening on the user 2.

FIG. 3 shows the display device 5, which takes the form of augmented reality (AR) goggles. The goggles 18 consist of a curved or straight frame element, each time having a display 5 situated in the visual field 17 of the user 2. In the visual field 17 of the user 2, full-surface or individual, selective recordings can be made.

FIG. 4 shows as an example the course of a training session with the training apparatus 1. The training with the training apparatus 1 takes place in a training room 19, which is subdivided by multiple walls. The user 2 carries a display device 5 within his visual field 17 during the training, with which virtual targets 13 are superimposed for him with the augmented reality (AR) device. It is critical that the user 2 can see all real objects during the training, such as walls, doors, ceilings, floors, furniture, his weapon, his hands or his feet, and his equipment through the display device 5.

The user 2 enters the training room 19 through the entrance 20 and moves through the sensor field 22*a* which is created by two sensors 21*a*. His movement through the sensor field 22 is detected by the sensors 21 and transmitted by radio to the arithmetic unit 25. The arithmetic unit 25 now sends data to the display device 5 of the user 2. The data involves the representation of a virtual target 13*a*, which according to FIG. 4 is presented as a human opponent 24*a*. The computing unit 25 can moreover determine when and where the opponent 24*a* should be presented in the display device 5 of the user 2.

In order to eliminate the opponent 24*a*, the user 2 must now fire a live shot with his weapon 4 in the direction of the virtual target 13*a*. The fired projectile 7 is now detected by the two lasers 9, 11 and the data are sent to the arithmetic unit 25. The projectile 7 is intercepted by a backstop, not shown. The arithmetic unit 25 computes the ballistics 8 of the projectile 7 and from this it can ascertain whether or not the user 2 has hit the virtual opponent 24*a*. The result of the firing (hits) is shown to the user 2 on his display device 5.

The user 2 now moves further inside the training room 19 and passes through another sensor field 22*b*, which is sent out by the sensors 21*b*. The sensors 21*b* again communicate this to the computing unit 25, which sends another virtual target 13*b* to the display device 5 of the user 2. The computing unit 25 moreover again indicates when and where the virtual target 13*b* in the form of another personal opponent 24*b* is presented to the user 2.

As soon as the user 2 sees the virtual opponent 24, once again a shot is fired in his direction with the weapon 3. The projectile 7 is detected by the lasers 9, 11 and the data are sent to the computing unit 25. The computing unit 25 now once again determines the ballistics 8 of the projectile 7 and calculates whether or not the user 2 has hit the virtual target 13*b*. After this, the result is shown to the user 2 on his display device 5.

FIG. 5 shows the training apparatus 1 with a safety region 27 and a shooting region 28. By the term safety region 27 is meant a defined region within which no projectile may be fired. This means that the safety region 27 is a kind of protected region and is excluded from the shooting training. For example, the safety region 27 is a place where other persons can stay who might be accidentally hit by the projectile.

The user 2 carries a weapon 3, which fires a real projectile 7. Within the visual field 17 of the user 2 there is located the display device 5 with the augmented reality (AR) device. The display device 5 takes the form of goggles (mixed-reality goggles), whereby the user 2 sees the surroundings as through normal viewing or reading goggles, but in addition holographic, virtual targets 13 are superimposed in the visual field 17 for him.

In the embodiment of FIG. 5, the safety region 27 extends for an angle of 270° and the shooting region 28 for an angle of 90°. The shooting region 28 can additionally be marked by two tags 29, which are located on either end of the backstop 14. In addition, the user 2 and/or the weapon 3 has a position sensor. Preferably, the arithmetic unit 25 will now determine the shooting region 28 and the safety region 27 with the aid of the position sensor and the two tags 29 and carry out the respective actions should the user 2 move his weapon 3 outside of the shooting region 27. The actions can be, for example, an optical and/or acoustical message or an impulse or some other haptic signal.

LEGEND FOR FIGURES

1. Training apparatus
2. User
3. Weapon
4. Helmet
5. Display device
6. Head-Up display
7. Projectile
8. Ballistics
9. Laser (No. 1)
10. Laser signal of 9
11. Laser (No. 2)
12. Laser signal of 11
13. Target
14. Backstop
15. Floor
16. Ceiling
17. Visual Geld
18. Goggles
19. Training room
20. Entrance
21. Sensor
22. Sensor field
23. Target
24. Opponent
25. Computing unit
26. Control unit
27. Safety region
28. Shooting region
29. Tags

The invention claimed is:

1. A training apparatus for at least one user with a weapon, consisting of a device for detecting a hit and a display device for representation of virtual targets, wherein the user-carried display device is configured as an augmented reality (AR) device, which visually displays to the user at least the target to be hit, wherein the weapon takes the form of a firearm, which shoots at least one projectile, wherein the projectile is detected by at least one laser, evaluated, and visually represented on the display device and that the pointing of the weapon can be determined with at least one sensor, wherein an arithmetic unit defines a shooting region and a safety region and monitors the current pointing of the weapon in regard to the regions and the arithmetic unit can determine when the weapon leaves the shooting region and triggers an action.

2. The training apparatus according to claim 1, wherein the training apparatus comprises one or two consecutively arranged lasers, which detect the projectile and determine from this the ballistics of the projectile.

3. The training apparatus according to claim 1, wherein the action is an acoustical or optical signal and/or a tactile action.

4. The training apparatus according to claim 1, wherein the shooting region and the safety region is defined by coordinates.

5. The training apparatus according to claim 1, wherein the shooting region and the safety region is defined by angles.

6. The training apparatus according to claim 1, wherein the shooting region and the safety region is defined by tags and multiple tags are arranged inside a room or on a shooting course.

7. The training apparatus according to claim 1, wherein the pointing of the weapon at a target within the shooting region is indicated to the user by an optical signal with the display device and the user receives a new optical signal when the weapon is pointed outside the shooting region.

8. The training apparatus according to claim 1, wherein the trigger of the weapon has a locking device and the locking device is active so that no projectile can be fired when the weapon is moved out from the shooting region into the safety region.

9. The training apparatus according to claim 1 wherein the user carries at least one pad, which puts out an impulse, and the user receives an impulse through the pad when the weapon is moved out from the shooting region into the safety region.

10. The training apparatus according to claim 1, wherein the Augmented Reality (AR) device takes the form of goggles or a Head-Up display.

11. The training apparatus according to claim 1, wherein the display device represents images, photos and/or videos visually with 2D or 3D models.

12. The training apparatus according to claim 1, wherein the sensor takes the form of a light barrier, a thermal image camera or a pressure plate.

* * * * *